United States Patent Office 3,364,115
Patented Jan. 16, 1968

3,364,115
ANTIBIOTICS AND PROCESS FOR PRODUCING THE SAME USING *STREPTOMYCES CAELESTIS*
Donald J. Mason, Portage, and Curtis E. Meyer, Galesburg, Mich., assignors to The Upjohn Company, Kalamazoo, Mich., a corporation of Delaware
Filed Nov. 27, 1964, Ser. No. 414,123
27 Claims. (Cl. 167—65)

ABSTRACT OF THE DISCLOSURE

Antibiotics produced by *Streptomyces caelestis* when cultured in a medium in which an ω-alkylthio-α-amino acid is present. The antibiotics can be represented by the following empirical formulas:

$$C_7H_{10}N_2O \cdot C_mH_{2m+2}S$$

wherein $m$ is an integer from 1 to 8, inclusive; and $C_7H_{10}N_2O$. The compounds have antibacterial activity and can be used in various environments in inhibit microorganisms such as *Proteus vulgaris* and *Escherichia coli*.

This invention relates to new compositions of matter and to a process for producing them. More particularly it relates to new antibiotics and to a process for producing them.

The novel antibiotics of this invention are produced by the cultivation of *Streptomyces caelestis*, NRRL 2418, under aerobic conditions in an aqueous nutrient medium to which has been added an effective amount of an ω-alkylthio-α-amino acid of the formula:

$$R-S-(CH_2)_n-CH(NH_2)-COOH$$

wherein R is a lower alkyl group containing from 1 to 8 carbon atoms, inclusive, and $n$ is an integer from 1 to 4, inclusive. The new antibiotics have the property of adversely affecting the growth of various gram-positive and gram-negative bacteria. Accordingly, they can be used alone or in combination with other antibacterial agents for the suppression of bacteria in various environments.

The microorganism employed in the fermentation process of this invention is *Streptomyces caelestis*, NRRL 2418, whose production of the antibiotic celesticetin is described in U.S. Patent 2,928,844. It has now been found that the cultivation of *Streptomyces caelestis* in an aqueous nutrient medium in which an ω-alkylthio-α-amino acid has been incorporated results not only in the production of the antibiotic celesticetin, but also in the production of the novel antibiotics described hereinafter.

The antibiotics produced by *Streptomyces caelestis* when cultured in a medium to which an ω-alkylthio-α-amino acid has been added can be represented by the empirical formulas $$C_7H_{10}N_2O \cdot C_mH_{2m+2}S$$

wherein $m$ is an integer from 1 to 8, inclusive; and $C_7H_{10}N_2O$. The antibiotic having the formula $$C_7H_{10}N_2O$$

which has been named desdanine (U–22,662), in each case accompanies an antibiotic of the formula $$RC_7H_{11}N_2OS$$

wherein R is lower alkyl. The former may be the result of some degradation of the sulfur-containing antibiotic. In any event, the $C_7H_{10}N_2O$ antibiotic, desdanine, also can be obtained from sulfur-containing antibiotics of the formula $$RC_7H_{11}N_2OS$$

by heating the latter in dioxane solution, advantageously under reflux, with the splitting out of the mercaptan RSH.

The antibiotic having the formula $$C_8H_{14}N_2OS$$

which has been named desdamethine (U–11,994), is formed when 3-(methylthio)alanine or 3-(methylthio)-2-aminobutyric acid is added to the culture medium. When the terminal alkylthio group is an ethylthio group, the antibiotic produced, which has been named ethesdanine (U–20,207), has the formula $$C_9H_{16}N_2OS$$

Similarly, when the terminal alkylthio group is a propylthio group, the sulfur-containing antibiotic has the formula $$C_{10}H_{18}N_2OS$$

When it is a butylthio group, the antibiotic has the formula $$C_{11}H_{20}N_2OS$$

Each of the ω-alkylthio-α-amino acids can exist as D- and L-stereoisomers, and both forms, as well as the DL-racemate, can be used in the practice of this invention. Choice of the particular stereoisomer used is frequently based upon readiness of availability. In the case of the alkylthio acids prepared from the naturally-occurring amino acids, the L-form is usually used; in the case of the totally synthetic alkylthio amino acids where a DL-racemic mixture is obtained, the racemate is added to the culture medium without subjecting it to resolution.

The amount of ω-alkylthio-α-amino acid added to the culture medium depends somewhat upon the characteristics of the particular acid which is added; of these, toxicity of the acid is a limiting factor. In general, the amount used is from about 0.5–4 g./liter of medium; a preferred amount is about 2 g./liter except in those cases where toxicity of the acid dictates use of a smaller amount. Addition of the ω-alkylthio-α-amino acid to the culture medium can be by a single addition of the total amount to be used, by multiple additions of smaller amounts, or by continuous feeding. The acid can be added at the beginning of the fermentation or it can be added after the fermentation has progressed for some time. In general, the acid is usually added in one treatment after the fermentation has proceeded for about 24 to about 40 hours.

The medium to which the ω-alkylthio-α-amino acid is added can be any which is conducive to the growth of *Streptomyces caelestis*. Satisfactory media, for example, are those described in U.S. Patent 2,928,844 for the production of the antibiotic celesticetin by *Streptomyces caelestis* and those illustrated in the examples. Temperatures employed for the fermentation can be between about 20 and about 37° C.; the preferred range is between about 27 and about 29° C. The pH of the medium is usually below 7 during most of the fermentation and then begins to approach 7 after about 96 hours or so. In general, when the pH of the fermentation rises higher than about 7, the yield of antibiotic drops. The fermentation is usually harvested after about 96 hours.

The antibiotics produced by *Streptomyces caelestis* when an ω-alkylthio-α-amino acid is incorporated in the culture medium can be obtained from the fermentation beer by extraction techniques with water-immiscible solvents. Suitable such solvents are methylene chloride, 1-butanol, lower alkyl alkanoates such as ethyl acetate, butyl acetate and amyl acetate, and ketones such as isopropyl butyl ketone. The antibiotics produced by the process of this invention are basic compounds which react with acids to form mono acid addition salts. Accordingly, they can also be recovered by adsorption techniques, for example, adsorption on cationic exchange resins and elution therefrom. Cationic exchange resins which can be used include both carboxylic acid resins (exemplified by Amberlite IRC–50 and Zeocarb 226) and sulfonic acid resins (exemplified by Dowex 50, Amberlite IR–120, Nalcite HCR, Chempro C–20, Permutit Q and Zeokarb 225). They can also be obtained by adsorption on carbon and elution therefrom.

The antibiotics thus obtained are further purified by recrystallization or by converting them to water-soluble acid addition salts and reprecipitating the free base by the addition of a water-soluble base. Alternatively, the solution of the water-soluble acid addition salt can be extracted with a water-immiscible solvent prior to regeneration of the antibiotic free base. Insoluble acid-addition salts of the antibiotics can also be employed in the purification procedures. For example, the antibiotics can be converted to an insoluble salt such as the picrate which is subjected to purification procedures (such as lixiviation or crystallization) and then treated with a base to regenerate the antibiotic as the free base. If desired, the antibiotics can be converted to acid addition salts and isolated as such.

The antibiotic having the formula $$C_7H_{10}N_2O$$

has been named desdanine. It is a colorless, crystalline solid having a molecular weight of 138 (titration, 146) and a pKa' of 5.72 (water). Desdanine is a basic antibiotic which reacts with acids to form mono acid addition salts. The free base is very slightly soluble in methanol, ethanol, ethyl acetate, dioxane, and chloroform. It is soluble in warm dimethylformamide from which it can be recrystallized. It is soluble in water to the extent of about 1 mg./ml. The melting point of desdanine is indefinate, decomposition accurring at about 200° C. Desdanine is optically inactive.

The ultraviolet spectrum of desdanine (FIG. 1) shows maximum absorptivities of 122.75 at 237 mμ in 0.1 N hydrochloric acid and of 146 at 235 mμ in 0.1 N sodium hydroxide solution. The infrared absorption spectrum of desdanine (FIG. 2 and Table I) shows peaks at 3310 and 3080 cm.$^{-1}$ indicative of OH and/or NH bonds, at 1680, 1630, and 1595, indicative of oxygen and/or carbon doubly bonded to carbon, and at 1140, indicative of oxygen and/or nitrogen singly bonded to carbon. Strong adsorption is also shown at 1385 and 975 cm.$^{-1}$.

Desdanine, either as the free base or as an acid addition salt, has the property of adversely affecting the growth of both gram-positive and gram-negative bacteria. It can be used alone or in combination with other antibacterial agents in the suppression of bacteria in various environments. Its activity against representative bacteria is shown in Table II.

Table I.—*Infrared spectrum of desdanine in mineral oil mull*

| Wave length (cm.$^{-1}$) | Intensity | Wave length (cm.$^{-1}$) | Intensity |
|---|---|---|---|
| 3,310 | S | 1,283 | W |
| 3,085 | S | 1,267 | M |
| 2,975 | S (Oil) | 1,242 | W |
| 2,950 | S (Oil) | 1,230 | M |
| 2,920 | S (Oil) | 1,215 | W |
| 2,850 | S (Oil) | 1,167 | W |
| 1,840 | W | 1,137 | W |
| 1,678 | S | 1,042 | W |
| 1,628 | S | 1,015 | W |
| 1,596 | S | 978 | S |
| 1,455 | M (Oil) | 930 | W |
| 1,442 | M | 910 | W |
| 1,425 | S | 867 | W |
| 1,388 | S | 805 | W |
| 1,344 | S | 760 | W |
| 1,310 | M | 700 | M |

Band intensities as indicated in the above infrared spectrum are referred to as S, M, and W. They are approximated in terms of the backgrounds in the vicinity of the bands an S band is of the same order of intensity as the strongest band in the spectrum, an M band is between ⅓ and ⅔ as intense as the strongest band, and a W band is less than ⅓ as intense as the strongest band. These estimates are made on the basis of a percent transmission scale.

Table II.—*Antibacterial spectrum of desdanine*

Organism:  MIC (mcg./ml.)[1]
- *Pseudomonas aeruginosa* ___________________ 100
- *Salmonella schottmuelleri* ________________ 25
- *Klebsiella pneumoniae* ____________________ 25
- *Proteus vulgaris* _________________________ 25
- *Escherichia coli* _________________________ 50
- *Bacillus subtilis* ________________________ 50
- *Staphylococcus aureus* ____________________ 25–50
- *Streptococcus faecalis* ___________________ 100
- *Streptococcus hemolyticus* ________________ 50

[1] MIC=minimum inhibitory concentration. Test method: Two fold dilutions in brain heart infusion broth.

Desdanine is useful for inhibiting *Proteus vulgaris* in paper mill systems where the organism is an odor producer also, it can be used for preventing rot and spoilage of shell eggs caused by *Proteus vulgaris*. It is useful in wash solutions for washing equipment, furnishings, wall and floors in dental and medical offices and in hospitals for controlling the population of staphylococci. For these purposes, salts of desdanine are preferred because of their greater solubility and particularly salts such as the hydrochloride, sulfate and phosphate, because of both their solubility and economy.

Certain acid addition salts of desdanine, particularly desdanine hexafluoroarsenate and desdanine hexafluorophosphate, are useful parasiticides as are the corresponding salts of morpholine and piperidine which are disclosed in U.S. Patents 3,122,536, and 3,122,552.

Desdanine is produced when *Streptomyces caelestis* is cultured in a nutritive medium to which an ω-alkylthio-α-amino acid has been added. Thus, it is produced when such acids as 3-(methylthio)alanine, 3-(ethylthio)alanine, and 4-(methylthio)-2-aminobutyric acid (methionine) are added to the culture medium. Other acids such as 3-(propylthio)alanine, 3-(butylthio)alanine, 3-(pentylthio)alanine, 3-(hexylthio)alanine, 3-(octylthio)alanine, 4-(propylthio)-2-aminobutyric acid, 4-(butylthio)-2-aminobutyric acid, 4-(octylthio)-2-aminobutyric acid, 5-(methylthio)-2-aminovaleric acid (5-(methylthio)norvaline), 5-(ethylthio)-2-aminovaleric acid (5-(ethylthio)norvaline), 6-(methylthio)-2-aminohexanoic acid (6(methylthio) norleucine) and 6-(butylthio)-2-aminohexanoic acid (6-(butylthio)norleucine) can also be incorporated in the fermentation, but for the production of desdanine the use of the more readily available ω-alkylthio-α-amino acids is preferred.

Desdanine can be obtained from fermentation beers by extraction techniques and by adsorptive techniques; extraction techniques are preferred. In a preferred procedure for the recovery of desdanine, the fermentation beer is filtered and, after adjustment of its pH to 6.3 by the addition of hydrochloric acid, extracted with methylene chloride which removes the celesticetin produced also in the fermentation, The pH of the extracted beer is adjusted to pH 10 by the addition of sodium hydroxide solution, and the alkaline beer is extracted with 1-butanol. Concentration of the 1-butanol extracts yields desdanine. The desdanine thus obtained is further purfied by converting it to a water-soluble acid addition salt, such as the hydrochloride, and regenerating desdanine by the addition of a base.

The antibiotic having the formula $$C_8H_{14}N_2OS$$

has been named desdamethine. It is a colorless, crystalline solid having a molecular weight of 186 (titration, 178) and a pKa' of 6.83 (water). Desdamethine is a basic antibiotic which reacts with acids to form mono acid addition salts. The free base is soluble to the extent of about 20 mg./ml. in water and in warm ethanol. It is soluble in dimethylformamide, slightly soluble in methylene chloride, and insoluble in ether and petroleum ether. The melting point of desdamethine is 123–125° C., and its determination is accompanied by a strong, unpleasant odor. Desdamethine is optically inactive.

Desdamethine has no ultraviolet absorption, but preparations of desdamethine which have undergone some conversion to desdamine do exhibit some ultraviolet absorption due to the presence of the latter antibiotic.

The infrared adsorption spectrum of desdamethine (FIG. 3 and Table III) shows peaks at 3320 and 3130 cm.$^{-1}$ indicative of OH and/or NH bonds, at 1690, 1675, and 1645 indicative of oxygen and/or carbon doubly bonded, to carbon, and at 1195 and 1020 indicative of oxygen and/or nitrogen singly bonded to carbon.

Desdamethine, either as the free base or as an acid addition salt, has the property of adversely affecting the growth of both gram-positive and gram-negative bacteria. It can be used alone or in combination with other antibacterial agents for the suppression of bacteria in various environments. Its activity against representative bacteria is shown in Table IV.

*Table III.—Infrared spectrum of desdamethine in mineral oil mull*

| Wave length (Cm.$^{-1}$) | Intensity | Wave length (Cm.$^{-1}$) | Intensity |
|---|---|---|---|
| 3,320 | S | 1,307 | M |
| 3,130 | S | 1,265 | W |
| 2,950 | S (Oil) | 1,220 | W |
| 2,920 | S (Oil) | 1,192 | M |
| 2,850 | S (Oil) | 1,155 | W |
| 1,683 | S | 1,135 | W |
| 1,672 | S | 1,060 | W |
| 1,640 | S | 1,045 | W |
| 1,456 | W (Oil) | 1,015 | W |
| 1,442 | W | 968 | W |
| 1,433 | S | 940 | W |
| 1,423 | S | 915 | W |
| 1,418 | M | 882 | W |
| 1,395 | M | 874 | W |
| 1,375 | M | 825 | W |
| 1,345 | W | 807 | W |

Band intensities as indicated in the above infrared spectrum are referred to as S, M, and W. They are approximated in terms of the backgrounds in the vicinity of the bands; an S band is of the same order of intensity as the strongest band in the spectrum, an M band is between ⅓ and ⅔ as intense as the strongest band, and a W band is less than ⅓ as intense as the strongest band. These estimates are made on the basis of a percent transmission scale.

*Table IV.—Antibacterial spectrum of desdamethine*

| Organism: | MIC (mcg./ml.)[1] |
|---|---|
| Staphylococcus aureus | 32 |
| Streptococcus hemolyticus | 125 |
| Streptococcus faecalis | 125 |
| Bacillus subtilis | 125 |
| Escherichia coli | 32 |
| Proteus vulgaris | 32 |
| Proteus rettgeri | 32 |
| Salmonella schottmuelleri | 32 |
| Klebsiella pneumoniae | 32 |
| Pseudomonas, aeruginosa | 250 |

[1] MIC=minimum inhibitory concentration. Test method: Two fold dilutions in brain heart infusion broth.

Desdamethine is useful for inhibiting *Proteus vulgaris* and *Escherichia coli* in paper mill systems where they are odor producers and for preventing rot and spoilage of shell eggs caused by *Proteus vulgaris*. Desdamethine is useful in wash solutions for washing equipment, furnishings, walls and floors in dental and medical offices and in hospitals for controlling the population of staphylococci and preventing epidemics caused by this organism. For these purposes, salts of desdamethine are preferred because of their greater solubility and particularly salts such as the hydrochloride, sulfate, and phosphate because of both their solubility and economy.

Certain acid addition salts of desdamethine, particularly desdamethine hexafluoroarsenate and desdamethine hexafluorophosphate, are useful as parasiticides as are the corresponding salts of morpholine and piperidine which are disclosed in U.S. Patents 3,122,536, and 3,122,552.

Desdamethine is produced when *Streptomyces caelestis* is cultured in a nutritive medium to which an ω-methylthio-α-amino acid has been added. Thus, it is produced when such acids as 3-(methylthio)alanine and 4-(methylthio)-2-aminobutyric acid (methionine) are added to the culture medium. Other acids such as 5-(methylthio)-2-aminovaleric acid (5-(methylthio)norvaline) and 6-(methylthio)-2-aminohexanoic acid (6-(methylthio)norleucine) can also be incorporated in the fermentation, but the more readily available 3-(methylthio)-alanine and 4-(methylthio)-2-aminobutyric acid are preferred.

Desdamethine can be obtained from fermentation beers by extraction techniques and by adsorptive techniques; extraction techniques are preferred. In a preferred procedure for the recovery of desdamethine, the fermentation beer is filtered and, after adjustment of its pH to 6.3 by the addition of hydrochloric acid, extracted with methylene chloride which removes the celesticetin also produced in the fermentation. The pH of the extracted beer is adjusted to pH 10 by the addition of sodium hydroxide solution, and the alkaline beer is extracted with methylene chloride. Concentration of the methylene chloride extracts yields desdamethine which is further purified by recrystallization from ethyl acetate.

The antibiotic having the formula $C_9H_{16}N_2OS$ has been named ethesdanine. It is an optically inactive, basic antibiotic which has a pKa' of 6.71 (water) and reacts with acids to form mono acid addition salts. The hydrochloride is a colorless, crystalline solid which selts at 155–158° C., and has a molecular weight of 236 (titration, 245).

Ethesdanine has no ultraviolet absorption, but preparations of ethesdanine which have undergone some conversion to desdanine do exhibit some ultraviolet absorption due to the presence of the latter antibiotic.

The infrared absorption spectrum of ethesdanine hydrochloride (FIG. 4 and Table V) shows peaks at 3170 and 3130 cm.$^{-1}$ indicative of OH and/or NH bonds, at 1720 indicative of oxygen doubly bonded to carbon, and at 1245, 1175, 1145, 1110, and 1020 indicative of oxygen and/or nitrogen singly bonded to carbon.

Ethesdanine, either as the free base or as an acid addition salt, has the property of adversely affecting the growth of both gram-positive and gram-negative bacteria.

It can be used alone or in combination with other antibacterial agents for the suppression of bacteria in various environments. Its activity against representative bacteria is essentially the same as that in Table IV for desdamethine, and it is useful for the same purposes as desdamethine.

Table V.—Infrared spectrum of ethesdanine hydrochloride

| Wave length (Cm.⁻¹) | Intensity | Wave length (Cm.⁻¹) | Intensity |
|---|---|---|---|
| 3,180 | S | 1,320 | M |
| 3,135 | S | 1,292 | M |
| 2,950 | S (Oil) | 1,268 | M |
| 2,920 | S (Oil) | 1,245 | S |
| 2,850 | S (Oil) | 1,200 | W |
| 2,815 | M | 1,173 | M |
| 2,750 | M | 1,140 | W |
| 2,680 | M | 1,110 | M |
| 2,635 | M | 1,070 | W |
| 2,520 | M | 1,062 | W |
| 2,490 | M | 1,045 | W |
| 2,400 | M | 1,022 | M |
| 1,775 | W | 988 | W |
| 1,720 | S | 975 | W |
| 1,675 | W | 955 | W |
| 1,583 | W | 930 | W |
| 1,550 | W | 902 | W |
| 1,463 | M | 888 | W |
| 1,445[1] | S | 840 | W |
| 1,432 | M | 793 | W |
| 1,420 | W | 760 | W |
| 1,385 | M | 731 | W |
| 1,375 | M (Oil) | 676 | M |
| 1,365 | M | | |

[1] The Nujol band at 1458 cm.⁻¹ is not defined in this spectrum but nevertheless increases absorbance in this region.

Band intensities as indicated in the above infrared spectrum are referred to as S, M, and W. They are approximated in terms of the backgrounds in the vicinity of the bands; an S band is of the same order of intensity as the strongest band in the spectrum, an M band is between ⅓ and ⅔ as intense as the strongest band, and a W band is less than ⅓ as intense as the strongest band. These estimates are made on the basis of a percent transmission scale.

Certain acid addition salts of ethesdanine, particularly ethesdanine hexafluoroarsensate and ethesdanine hexafluorophosphate, are useful as parasiticides as are the corresponding salts of morpholine and piperidine which are disclosed in U.S. Patents 3,122,536, and 3,122,552.

Ethesdanine is produced when *Streptomyces caelestis* is cultured in a nutritive medium to which an ω-ethylthio-α-amino acid has been added. Thus, it is produced when such acids as 3-(ethylthio)alanine and 4-(ethylthio)-2-aminobutyric acid (ethionine) are added to the culture medium. Other acids such as 5-(ethylthio)-2-amino-valeric acid (5-(ethylthio)norvaline) and 6-(ethylthio)-2-aminohexanoic acid (6-(ethylthio)norleucine) can also be incorporated in the fermentation, but the more readily available 3-(ethylthio)alanine and 4-(ethylthio)-2-aminobutyric acid are preferred.

Ethesdanine can be obtained from fermentation beers by extraction techniques and by adsorptive techniques; extraction techniques are preferred. In a preferred procedure for the recovery of ethesdanine, the fermentation beer is filtered and, after adjustment of its pH to 6.3 by the addition of hydrochloric acid, extracted with methylene chloride which removes the celesticetin also produced in the fermentation. The pH of the extracted beer is adjusted to pH 10 by the addition of sodium hydroxide solution, and the alkaline beer is extracted with methylene chloride. The methylene chloride extracts are concentrated under reduced pressure to incipient crystallization and the desdanine which separates is removed by filtration. The filtrate is treated with alcohol and concentrated under reduced pressure to remove the methylene chloride and obtain an alcoholic solution of ethesdanine to which dry hydrogen chloride in ethanol is added until the pH is about 3. Ethesdanine hydrochloride is obtained by refrigeration and filtration of the acidified solution. It is further purified by dissolving in the minimum amount of water at room temperature, followed by the addition of sufficient alcohol to start crystallization, then chilling. After recovery of the crystalline material by filtration, addition of an equal volume of ethyl ether to the filtrate results in a second crop of crystals.

Other sulfur-containing antibiotics are prepared by adding to the medium ω-alkylthio-α-amino acids having alkylthio groups other than methylthio and ethylthio. For example, an antibiotic of the formula $$C_{10}H_{18}N_2OS$$

results when 3-(propylthio)alanine and 4-(propylthio)-2-aminobutyric acid are employed as additives, and an antibiotic of the formula $$C_{11}H_{20}N_2OS$$

results when 3-(butylthio)alanine and 4-(butylthio)-2-aminobutyric acid are added to the culture medium. Similarly, antibiotics having twelve to fifteen carbon atoms in the molecule are obtained when ω-alkylthio-α-amino acids having five to eight carbon atoms in the alkyl group are added to the culture medium fermentation.

The following examples are illustrative of the process and products of this invention but are not to be construed as limiting.

EXAMPLE 1.—DESDANINE

A seed medium having the following composition was prepared and sterilized; the post-sterilization pH was 7.2.

| | | |
|---|---|---|
| Glucose monohydrate | g./l__ | 10 |
| Yeastolac [1] | g./l__ | 10 |
| NZ amine B [2] | g./l__ | 5 |
| Tap water, q.s. | liters__ | 1 |

[1] Partial yeast autolyzate mixed with milk solids (Vico Products Corporation, Chicago, Ill.).
[2] Enzymatic digest of casein (Sheffield Chemical Company, Norwich, N.Y.).

The medium was inoculated with a fresh (not older than two weeks) slant of *Streptomyces caelestis*, NRRL 2418, and incubated at 28° C. for 48 hours in 500 ml. flasks with stirring at the rate of 250 r.p.m. on a Gump rotary shaker with a 2½" stroke.

A fermentation medium having the following composition was prepared and sterilized; the post-sterilization pH was 7.4.

| | | |
|---|---|---|
| Glucose monohydrate | g./l__ | 40 |
| Kay Soy [1] | g./l__ | 10 |
| Ammonium sulfate | g./l__ | 5 |
| Calcium carbonate | g./l__ | 5 |
| Lard oil | ml./l__ | 1 |
| Tap water, q.s. | liters__ | 1 |

[1] Kay Soy is finely-milled, fat extracted, soybean meal.

This medium (20 liters) was inoculated with a 5% inoculum of the seed whose preparation is described above. The fermentation was incubated at 28° C. with aeration at the rate of 15 liters/minute and stirring at the rate of 500 r.p.m. At the end of about 24 hours, 3-(ethylthio)-L-alanine was aseptically added to the fermentation in an amount corresponding to 2 g./liter, and the fermentation was continued for another 72 hours (total time, about 96 hours).

At harvest the fermentation beer was filtered with the aid of diatomaceous earth added to the beer in an amount corresponding to about 25 g./liter of beer. The filter cake was washed with 4 liters of deionized water, and the wash was added to the filtrate; the combined volume was about 18 liters. The pH of the combined filtrate and wash was adjusted to 6.3 with hydrochloric acid, and the solution was extracted with 3 portions of methylene chloride, each of which was ⅕ the volume of the solution; these extracts contained celesticetin which was produced during the fermentation.

The pH of the aqueous solution was adjusted to pH 10 by the addition of sodium hydroxide solution, and the alkaline solution was extracted twice with ½ volume portions of methylene chloride; these extracts contained ethesdanine.

The alkaline solution was then extracted twice with ½ volume portions of 1-butanol, and each butanol extract was subjected to concentration. When the first butanol extract had been reduced to about $\frac{1}{10}$ of its original volume, an amorphous, biologically inactive solid separated. The mixture was chilled at about 5° C. overnight, and the resulting solids were removed by filtration. The filtrate was concentrated under reduced pressure to about $\frac{1}{100}$ the volume of the original extract. The second butanol extract was also concentrated, but no amorphous solid separated. When the second extract had been concentrated to $\frac{1}{100}$ of its original volume, the extracts were combined; crystalline desdanine began to separate from the warm mixture. After overnight refrigeration, the desdanine was recovered by filtration, yield, 2.42 g. It was purified by dissolving it in dilute hydrochloric acid (pH of the solution was 4.2) and precipitating it by the slow addition of approximately 3 N ammonium hydroxide. After refrigeration, the crystalline antibiotic was recovered by filtration, washed with ice-water, and dried in a vacuum desiccator; yield of desdanine, 0.85 g.

Analysis.—Calcd. for $C_7H_{10}N_2O$: C, 60.83; H, 7.30; N, 20.29. Found: C, 60.49; H, 7.14; N, 19.59.

EXAMPLE 2.—DESDANINE

A 20 liter fermentation was conducted as in Example 1 with the exception that 4-(methylthio)-2-aminobutyric acid (DL-methionine) was added to the fermentation in place of 3-(ethylthio)-L-alanine. The amount used was the same, i.e., an amount corresponding to 2 g. of DL-methionine per liter of fermentation medium.

At harvest the fermentation beer (17 liters) was filtered with the aid of diatomaceous earth added to the beer in an amount of about 25 g./liter of beer. The filter cake was washed with 5 liters of water, and the wash was added to the filtrate; the combined volume was about 19 liters. The beer was extracted twice with Skellysolve B (isomeric hexanes), using each time an amount equal of ¼ the beer volume; any emulsion which formed was readily broken by filtration. The Skellysolve B extracts were discarded.

The pH of the beer was adjusted to pH 10 by the addition of sodium hydroxide solution, and the beer was extracted three times with ½ volume portions (10 liters) of 1-butanol. The first butanol extract was concentrated under reduced pressure and the temperature of the solution was not allowed to exceed 40° C. The first extract was concentrated to $\frac{1}{10}$ volume (1 liter), placed in a deep-freeze overnight, and the biologically inactive solid which separated was removed by filtration. The filtrate was added to the second and third butanol extracts which had been combined and similarly concentrated, and the concentration was continued until the volume was reduced to about $\frac{1}{18}$ that of the original total volume of the butanol extracts. The concentrate was placed in a deep-freeze and the crystalline desdanine which separated was recovered by filtration; yield, 4.5 g. (damp).

EXAMPLE 3.—DESDANINE

A fermentation was conducted as in Example 1 with exception that 3-(methylthio)-L-alanine was added to the fermentation in place of 3-(ethylthio)-L-alanine; the amount used was the same, i.e., an amount corresponding to 2 g. of 3-(methylthio)-L-alanine per liter of fermentation medium. Desdanine was isolated from the fermentation beer by the procedure employed in Example 1.

EXAMPLE 4.—DESDANINE HYDROCHLORIDE

To a suspension of 21.5 mg. of desdanine in 1 ml. of methanol was added two equivalents, 0.31 ml., of 1 N hydrogen chloride in methanol. To the resulting solution was added 3 ml. of ether; crystallization of desdanine hydrochloride resulted immediately. The crystals were recovered by filtration, washed with ether, and dried in a vacuum desiccator; yield of desdanine hydrochloride, 21 mg.; M.P. 190–215° C. with gradual darkening and decomposition.

Analysis.—Calcd. for $C_7H_{10}N_2O \cdot HCl$: C, 48.05; H, 6.35; N, 16.03; Cl, 20.30. Found: C, 47.67; H, 6.51; N, 15.77; Cl, 19.68.

Other salts of desdanine can be prepared in a similar manner by substituting other acids for the hydrochloric acid used above.

EXAMPLE 5.—DESDAMETHINE

A preseed medium having the following composition was prepared.

| | |
|---|---|
| Glucose monohydrate ______________________g./l__ | 10 |
| Yeastolac ________________________________g./l__ | 10 |
| NZ amine B _____________________________g./l__ | 5 |
| Tap water, q.s. __________________________liters__ | 1 |

A flask containing 100 ml. of the above medium was inoculated with a slant of *Streptomyces caelestis*, NRRL 2418, and incubated at 28° C. for 48 hours on a Gump rotary shaker operating at 250 r.p.m. with a stroke of 2½".

The flask was used to inoculate 20 liters of the above medium which was incubated at 28° C. for 24 hours with aeration at the rate of 10 liters per minute and stirring at the rate of 400 r.p.m. The seed culture so obtained was used to inoculate the fermentation medium.

The fermentation medium of the following composition was prepared and sterilized; post-sterilization pH was 7.5.

| | |
|---|---|
| Glucose monohydrate ______________________g./l__ | 40 |
| Kay soy _________________________________g./l__ | 10 |
| Ammonium sulfate ________________________g./l__ | 5 |
| Calcium carbonate ________________________g./l__ | 5 |

A fermentor containing 250 liters of sterile fermentation medium was inoculated with a 5% inoculum (12.5 liters) of the above-obtained seed culture. The fermentation was incubated at 28° C. with aeration at the rate of 100 liters per minute and stirring at the rate of 280 r.p.m. At the end of 24 hours, 500 g. of DL-methionine was added to the fermentation, and the fermentation was continued another 66 hours (total time, 90 hours).

At harvest the fermentation beer was filtered with the admixture of 4% of diatomaceous earth as a filter aid. The filter cake was washed with water, and the wash was added to the filtrate; the combined volume was about 270 liters. The pH of the combined filtrate and wash was adjusted to pH 10 by the addition of sodium hydroxide solution, and the alkaline solution was extracted twice with 125 liter portions of 1-butanol. The first butanol extract was concentrated to about $\frac{1}{20}$ volume, and the solid which separated (22.6 g.) was removed by filtration filtrate was added to the second butanol extract and the combined extracts were concentrated to a volume of about 6 liters and chilled; 28.7 g. of desdanine were obtained by filtration. The remaining filtrate was combined with that obtained from a duplicate run to yield a total of about 12 liters.

The butanol solution (12 liters) was extracted four times with 3-liter portions of dilute hydrochloric acid (pH about 4.5). The acid extracts were combined and the pH was adjusted to 10 by the addition of sodium hydroxide solution. The alkaline solution was extracted four times with 3-liter portions of methylene chloride. The first methylene chloride extract was concentrated under reduced pressure to incipient crystallization and chilled. The crystalline material which separated was recovered by filtration and recrystallized from 450 ml. of ethanol (1 part)-ethyl acetate (50 parts). A second recrystallization from 150 ml. of ethanol (1 part)-ethyl acetate (20 parts) produced 4.4 g. of desdamethine in the form of colorless crystals, M.P. 123–125° C.

*Analysis.*—Calcd. for $C_8H_{14}N_2OS$: C, 51.58; H, 7.58; N, 15.04; S, 17.21. Found: C, 52.38; H, 7.46; N, 14.98; S, 17.19.

EXAMPLE 6.—DESDAMETHINE

A series of flasks each containing 100 ml. of the preseed medium described in Example 5 and inoculated with a slant of *Streptomyces caelestis*, NRRL 2418, was incubated at 28° C. for 48 hours on a Gump rotary shaker operating at 250 r.p.m. with a stroke of 2½″. The seed culture so obtained was used to inoculate the fermentation medium as described in Example 5.

A series of flasks (50), each containing 100 ml. of the fermentation medium described in Example 5, was inoculated with a 5% inoculum (5 ml.) of the above-obtained seed culture. These flasks were incubated at 28° C. for 24 hours on a Gump rotary shaker operating at 250 r.p.m. with a stroke of 2½″. At the end of about 24 hours, 0.2 g. of 3-(methylthio)-L-alanine was added to each flask, and the fermentation was allowed to proceed for an additional 72 hours (total time, about 96 hours).

At harvest, the flasks were pooled to yield 4.5 liters of fermentation beer which was filtered with the admixture of about 2.5% of diatomaceous earth as a filter aid. The filter cake was washed with water, and the wash was added to the filtrate; the combined volume was about 5.5 liters. The pH of the combined filtrate and wash was adjusted to 6.3 by the addition of concentrated hydrochloric acid, and the solution was extracted twice with 2-liter portions of methylene chloride; these extracts contained celestice-tin.

The pH of the aqueous solution was adjusted to pH 10 by the addition of 5 N sodium hydroxide solution, and the alkaline solution was extracted four times with 2-liter portions of methylene chloride. The extracts were pooled and concentrated under reduced pressure to yield crystalline desdamethine. Recrystallization from ethyl acetate gave 240 mg. of colorless, crystalline desdamethine. A second crop of desdamethine weighing 250 mg. was obtained from the mother liquors.

*Analysis.*—Calcd. for $C_8H_{14}N_2OS$: C, 51.58; H, 7.58; N, 15.04; S, 17.21. Found: C, 51.84; H, 7.53; N, 15.01; S, 16.70.

EXAMPLE 7.—DESDAMETHINE HYDROCHLORIDE

To a suspension of 200 mg. of desdamethine in 1 ml. of absolute ethanol was added 0.22 ml. of 4.52 N ethanolic hydrogen chloride. The mixture was shaken, and solution slowly resulted. When solution was about complete, crystals of desdamethine hydrochloride began to separate; separation was complete in about 5 minutes. The product was rapidly recovered by filtration, washed with ethanol (1)-ether (1) and dried; yield of desdamethine hydrochloride, 170 mg. On melting, the product showed signs of decomposition at 155–160° C., a melting effect at about 205° C., and decomposition at about 240° C.

*Analysis.*—Calcd. for $C_8H_{14}N_2OS \cdot HCl$: C, 43.13; H, 6.79; N, 12.58; S, 14.40; Cl, 15.91. Found: C, 43.68; H, 7.28; N, 12.64; S, 14.45; Cl, 15.80.

EXAMPLE 8.—ETHESDANINE AND ETHESDANINE HYDROCHLORIDE

The methylene chloride extracts obtained by extraction of the alkalinized beer (pH 10) in Example 1 were concentrated under reduced pressure to incipient crystallization and placed in a refrigerator. Crystals of desdanine separated and were recovered by filtration. The filtrate was subjected to distillation under reduced pressure while ethanol was added in order to obtain an alcoholic solution. Addition to this solution of dry hydrogen chloride in ethanol until the pH was about 3 and refrigeration of the acidified solution yielded crystals of ethesdanine hydrochloride; yield, 2.8 g., M.P. 155–158° C.

*Analysis.*—Calcd. for $C_9H_{16}N_2OS \cdot HCl$: C, 45.65; H, 7.23; N, 11.83; S, 13.54; Cl, 14.97. Found: C, 45.95; H, 7.49; N, 11.28; S, 13.71; Cl, 14.63.

Ethesdanine can be obtained from a solution of its hydrochloride by treatment of the solution with a base such as sodium hydroxide, extraction with methylene chloride, and evaporation of the methylene chloride.

Figure 1:
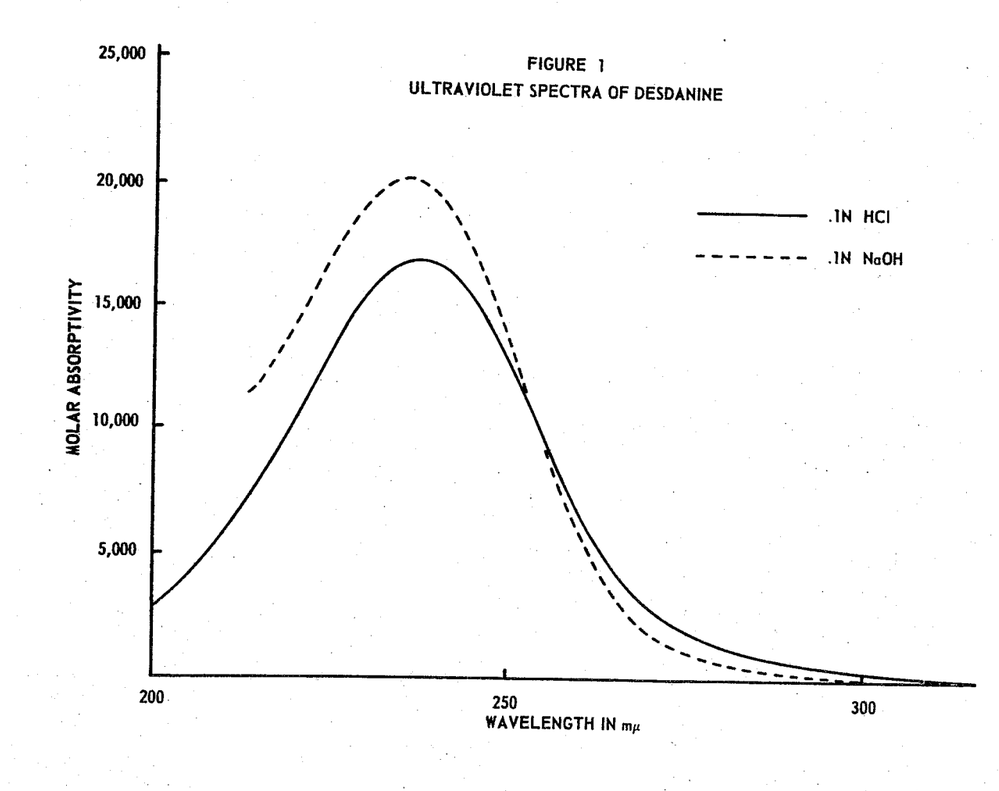
Figure 2:
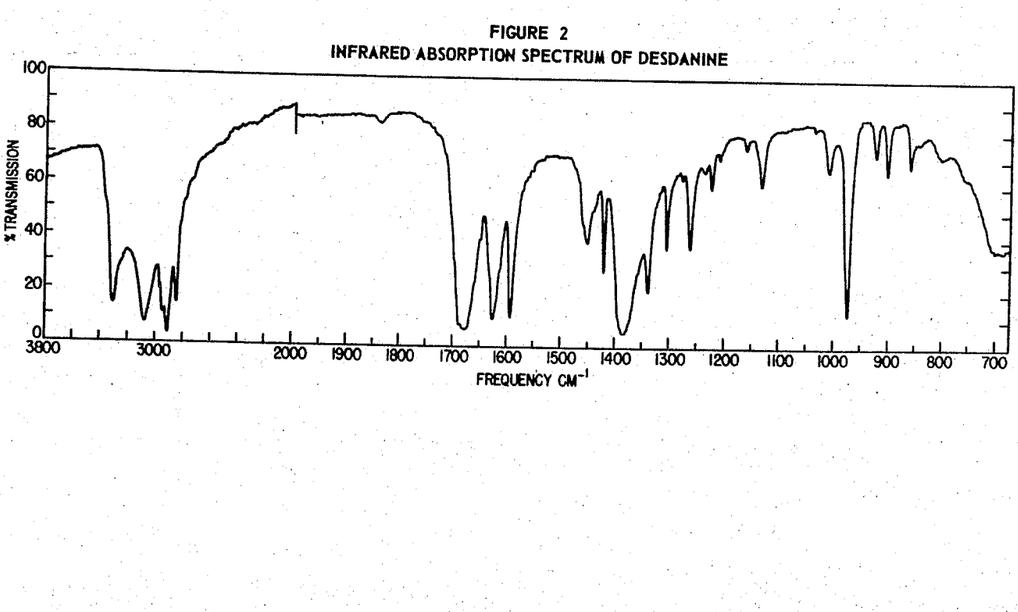

We claim:
1. Desdanine, which
   (a) is effective in inhibiting the growth of various gram-positive and gram-negative bacteria;
   (b) is monobasic; and in its essentially pure crystalline form
   (c) has a pKa' of 5.72 (water);
   (d) has a molecular weight of 138;
   (e) has an elemental analysis of C, 60.49; H, 7.14; and N, 19.59;
   (f) is optically inactive;
   (g) has a characteristic ultraviolet absorption spectrum as shown in FIGURE 1 of the accompanying drawings; and
   (h) has a characteristic infrared absorption spectrum as shown in FIGURE 2 of the accompanying drawings.

2. A process for producing desdanine, the compound defined in claim 1, which comprises cultivating *Streptomyces caelestis* under aerobic conditions in an aqueous nutrient medium to which has been added an effective amount of an ω-alkylthio-α-amino acid of the formula wherein R is a lower alkyl group containing from 1 to 8 carbon atoms, inclusive, and *n* is an integer from 1 to 4, inclusive.

3. A process for producing desdanine, the compound defined in claim 1, which comprises cultivating *Streptomyces caelestis* under aerobic conditions in an aqueous nutrient medium to which has been added an effective amount of an ω-alkylthio-α-amino acid of the formula wherein R is a lower alkyl group containing from 1 to 8 carbon atoms, inclusive.

4. A process according to claim 3 in which the ω-alkylthio-α-amino acid is 4-(methylthio)-2-aminobutyric acid.

5. A process for producing desdanine, the compound defined in claim 1, which comprises cultivating *Streptomyces caelestis* under aerobic conditions in an aqueous nutrient medium to which has been added an effective amount of an ω-alkylthio-α-amino acid of the formula wherein R is a lower alkyl group containing from 1 to 8 carbon atoms, inclusive.

6. A process according to claim 5 in which the ω-alkylthio-α-amino acid is 3-(methylthio)alanine.

7. A process according to claim 5 in which the ω-alkylthio-α-amino acid is 3-(ethylthio)alanine.

8. A process for producing desdanine, the compound defined in claim 1, which comprises cultivating *Streptomyces caelestis* under aerobic conditions in an aqueous nutrient medium to which has been added an ω-alkylthio-α-amino acid of the formula wherein R is a lower alkyl group containing from 1 to 8 carbon atoms, inclusive, and *n* is an integer from 1 to 4, inclusive, in an effective amount ranging from more than incidental impurities up to 3 grams/liter of aqueous nutrient medium.

9. A process for producing desdanine, the compound defined in claim 1, which comprises cultivating *Streptomyces caelestis* under aerobic conditions in an aqueous nutrient medium to which has been added an ω-alkylthio-α-amino acid of the formula wherein R is a lower alkyl group containing from 1 to 8 carbon atoms, inclusive, in an effective amount ranging from more than incidental impurities up to 3 grams/liter of aqueous nutrient medium.

10. A process according to claim 9 in which the ω-alkylthio-α-amino acid is 4-(methylthio)-2-aminobutyric acid.

11. A process for producing desdanine, the compound defined in claim 1, which comprises cultivating *Streptomyces caelestis* under aerobic conditions in an aqueous nutrient medium to which has been added an ω-alkylthio-α-amino acid of the formula $$R\text{---}S\text{---}CH_2\text{---}CH(NH_2)\text{---}COOH$$

wherein R is a lower alkyl group containing from 1 to 8 carbon atoms, inclusive, in an effective amount ranging from more than incidental impurities up to 3 grams/liter of aqueous nutrient medium.

12. A process according to claim 11 in which the ω-alkylthio-α-amino acid is 3-(methylthio)alanine.

13. A process according to claim 11 in which the ω-alkylthio-α-amino acid is 3-(ethylthio)alanine.

14. Desdanine, as defined in claim 1, in its essentially pure form.

15. Desdanine, as defined in claim 1, in its essentially pure crystalline form.

16. Acid addition salts of desdanine, the compound defined in claim 1.

17. The hydrochloride of desdanine, the compound defined in claim 1.

Figure 3:
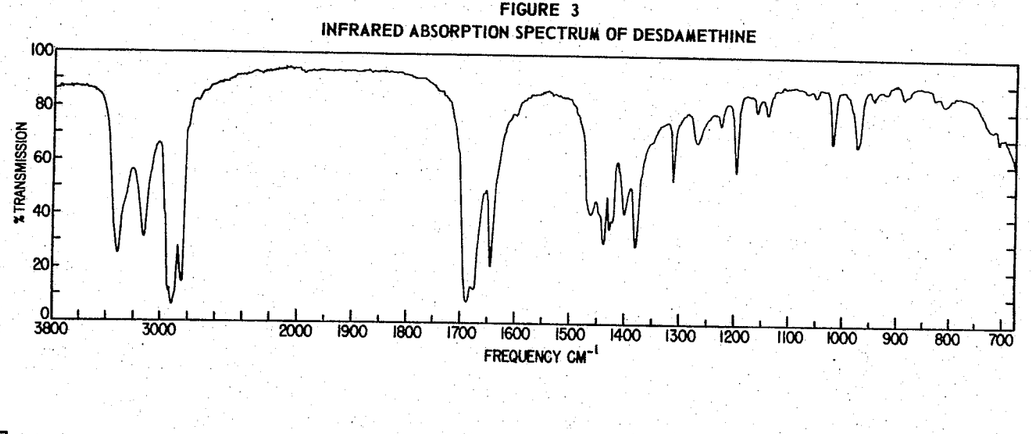

18. Desdamethine, which
 (a) is effective in inhibiting the growth of various gram-positive and gram-negative bacteria;
 (b) is monobasic; and in its essentially pure crystalline form
 (c) has a pKa' of 6.83 (water);
 (d) has a molecular weight of 186;
 (e) has an elemental analysis of C, 52.38; H, 7.46; N, 14.98; S, 17.19;
 (f) is optically inactive;
 (g) has no ultraviolet absorption maxima from 220 to 400 millimicrons; and
 (h) has a characteristic infrared absorption spectrum as shown in FIGURE 3 of the accompanying drawings.

19. Desdamethine, as defined in claim 18, in its essentially pure form.

20. Desdamethine, as defined in claim 18, in its essentially pure crystalline form.

21. Acid addition salts of desdamethine, the compound defined in claim 18.

22. The hydrochloride of desdamethine, the compound defined in claim 18.

Figure 4:
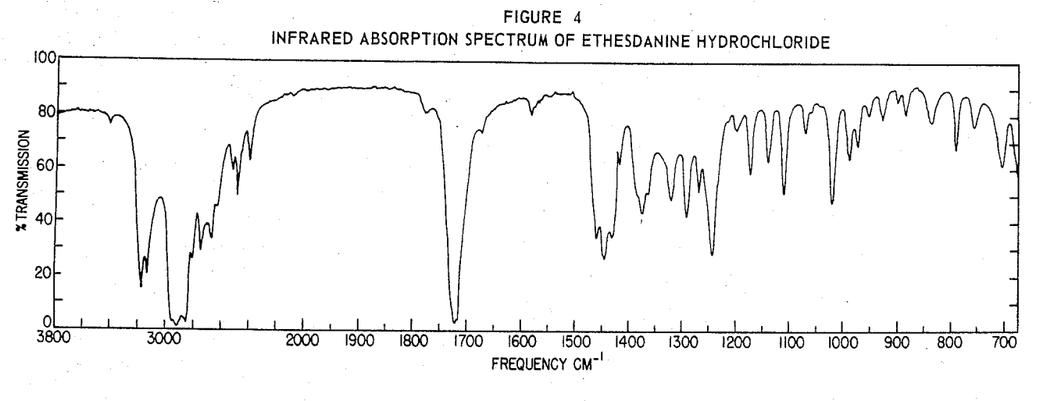

23. Ethesdanine, which
 (a) is effective in inhibiting the growth of various gram-positive and gram-negative bacteria;
 (b) is monobasic; and in its essentially pure crystalline form
 (c) has a pKa' of 6.71 (water);
 (d) has a molecular weight of 200;
 (e) is optically inactive; and whose hydrochloride in its essentially pure crystalline form
 (f) has a melting point of 155–158° C.;
 (g) has an elemental analysis of C, 45.95; H, 7.49; N, 11.28; S, 13.71; Cl, 14.63;
 (h) has no ultraviolet absorption maxima from 220 to 400 millimicrons; and
 (i) has a characteristic infrared absorption spectrum as shown in FIGURE 4 of the accompanying drawings.

24. Ethesdanine, as defined in claim 23, in its essentially pure form.

25. Ethesdanine, as defined in claim 23, in its essentially pure crystalline form.

26. Acid addition salts of ethesdanine, the compound defined in claim 23.

27. The hydrochloride of ethesdanine, the compound defined in claim 23.

References Cited

UNITED STATES PATENTS 2,928,844    3/1960    De Boer et al. ______ 260—326.3

ALBERT T. MEYERS, *Primary Examiner.*

D. M. STEPHENS, *Assistant Examiner.*